United States Patent
Liu et al.

(10) Patent No.: US 7,409,262 B2
(45) Date of Patent: Aug. 5, 2008

(54) SYSTEM AND METHOD FOR GENERATING MILLING CODES

(75) Inventors: Dao-Shan Liu, Shenzhen (CN); Hui Zou, Shenzhen (CN); Cheng-Yu Wang, Tu-Cheng (TW); Yao-Tser Liu, Tu-Cheng (TW)

(73) Assignees: Hong Fu Jin Precision Industry (Shenzhen) Co., Ltd., Boa-an District, Shenzhen, Guangdong Province (CN); Hon Hai Precision Industry Co., Ltd., Tu-Chen, Taipei Hsien (TW)

( * ) Notice: Subject to any disclaimer, the term of this patent is extended or adjusted under 35 U.S.C. 154(b) by 218 days.

(21) Appl. No.: 11/245,574

(22) Filed: Oct. 7, 2005

(65) Prior Publication Data

US 2006/0079990 A1  Apr. 13, 2006

(30) Foreign Application Priority Data

Oct. 8, 2004 (TW) ............................... 93130555 A

(51) Int. Cl.
*G06F 19/00* (2006.01)
*G05B 19/4097* (2006.01)

(52) U.S. Cl. ........................... 700/187; 700/173; 409/84

(58) Field of Classification Search ................. 700/186, 700/173, 187; 318/569; 409/84
See application file for complete search history.

(56) References Cited

U.S. PATENT DOCUMENTS

| 5,387,852 A * | 2/1995 | Maida et al. ................. 318/567 |
| 6,239,406 B1 * | 5/2001 | Onoma et al. ........... 219/121.82 |
| 2003/0170085 A1 * | 9/2003 | Kakino et al. ............... 409/132 |

FOREIGN PATENT DOCUMENTS

JP  10-080783  *  3/1998

* cited by examiner

*Primary Examiner*—Steven R. Garland
(74) *Attorney, Agent, or Firm*—Morris Manning Martin LLP; Tim Tingkang Xia, Esq.

(57) ABSTRACT

A system for generating milling codes includes a plurality of personal computers (10), a database (14), and an application server (12). The application server, connected between the personal computers and the database, includes a circular hole handling module (125), for handling circular holes of an engineering drawing, and receiving relevant parameters of the circular holes; a non-circular hole handling module (126), for determining and handling all non-circular holes of the engineering drawing, and receiving relevant parameters of the non-circular holes; a milling path generating module (128), for generating milling paths according to the parameters of the circular holes and the non-circular holes; and a milling code generating module (129), for generating milling codes according to the milling paths. A related method for generating milling codes is also provided.

16 Claims, 3 Drawing Sheets

SYSTEM AND METHOD FOR GENERATING MILLING CODES

BACKGROUND

1. Field of the Invention

The present invention relates to a system and method for generating machining codes, and particularly to a system and method for generating milling codes.

2. Related Art

With ongoing competition among production enterprises, many of these enterprises are taking great pains to improve their manufacturing efficiency. One solution is to employ milling machines having computer aided capability, which the computer has high hardware capability and low costs. A conventional milling machining mainly uses computer aided design (CAD) software to process an engineering drawing, so as to define machining accessories and generate milling codes. The milling codes are transmitted to a machining center via a floppy disk, a portable computing device, or direct numerical control (DNC) in order to process the machining accessories accordingly.

Conventionally, generating the milling codes based on the engineering drawings is performed and monitored manually. This can greatly retard production efficiency.

SUMMARY

A system for generating milling codes comprises a plurality of personal computers, a database, and an application server. The application server, connected between the personal computers and the database, comprises a circular hole handling module, for determining and handling circular holes of an engineering drawing, and receiving relevant parameters of the circular holes; a non-circular hole handling module, for determining and handling non-circular holes of the engineering drawing, and receiving relevant parameters of the non-circular holes; a milling path generating module, for generating milling paths according to the parameters of the circular holes and the non-circular holes; and a milling codes generating module, for generating milling codes according to the milling paths.

A method for generating milling codes includes steps of: (a) retrieving drawing information; (b) receiving milling parameters; (c) deleting unnecessary image cells in a drawing; (d) determining a machining boundary as a contour layer; (e) handling circular holes in the drawing; (f) determining whether there is a non-circular hole; (g) determining whether there is a back image cell; (h) generating milling paths according to a machining benchmark determined by the image cells in the contour layer and selecting a shortest milling path; and (i) generating milling codes according to the milling paths.

Other advantages and novel features will be drawn from the following detailed description of preferred embodiments with the attached drawings, in which:

DETAILED DESCRIPTION OF THE EMBODIMENTS

Figure 1:
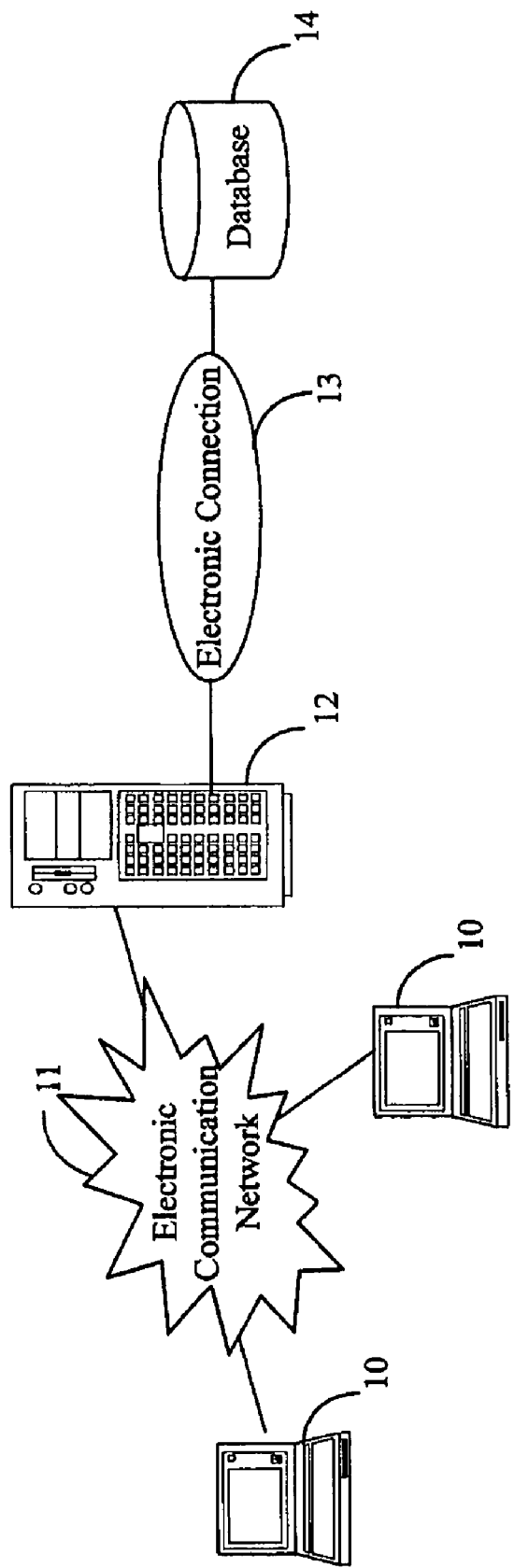
FIG. 1 is a block diagram of a system for generating milling codes of an exemplary embodiment of the present invention.

FIG. 1 is a block diagram of a system for generating milling codes ("the system") of an exemplary embodiment of the present invention. The system comprises a plurality of personal computers 10, an electronic communication network 11, an application server 12, an electronic connection 13, and a database 14.

Each personal computer 10 comprises a user interface, for interaction between users and the system. The personal computers 10 are connected to the application server 12 via the electronic communication network 11.

The application server 12 comprises a plurality of software modules for receiving milling machining parameters, deleting unnecessary image cells, generating milling codes, and so on. An image cell is a minimum unit of an engineering drawing. The electronic communication network 11 may be an intranet, the Internet, or another suitable kind of communication network. The database 14 stores information used or generated in the process of generating milling codes. In the exemplary embodiment, the information includes drawing information, milling parameter information, and milling code information.

The database 14 is connected to the application server 12 via the electronic connection 13. The electronic connection 13 is a database connectivity, such as an open database connectivity (ODBC) or a Java database connectivity (JDBC).

Figure 2:
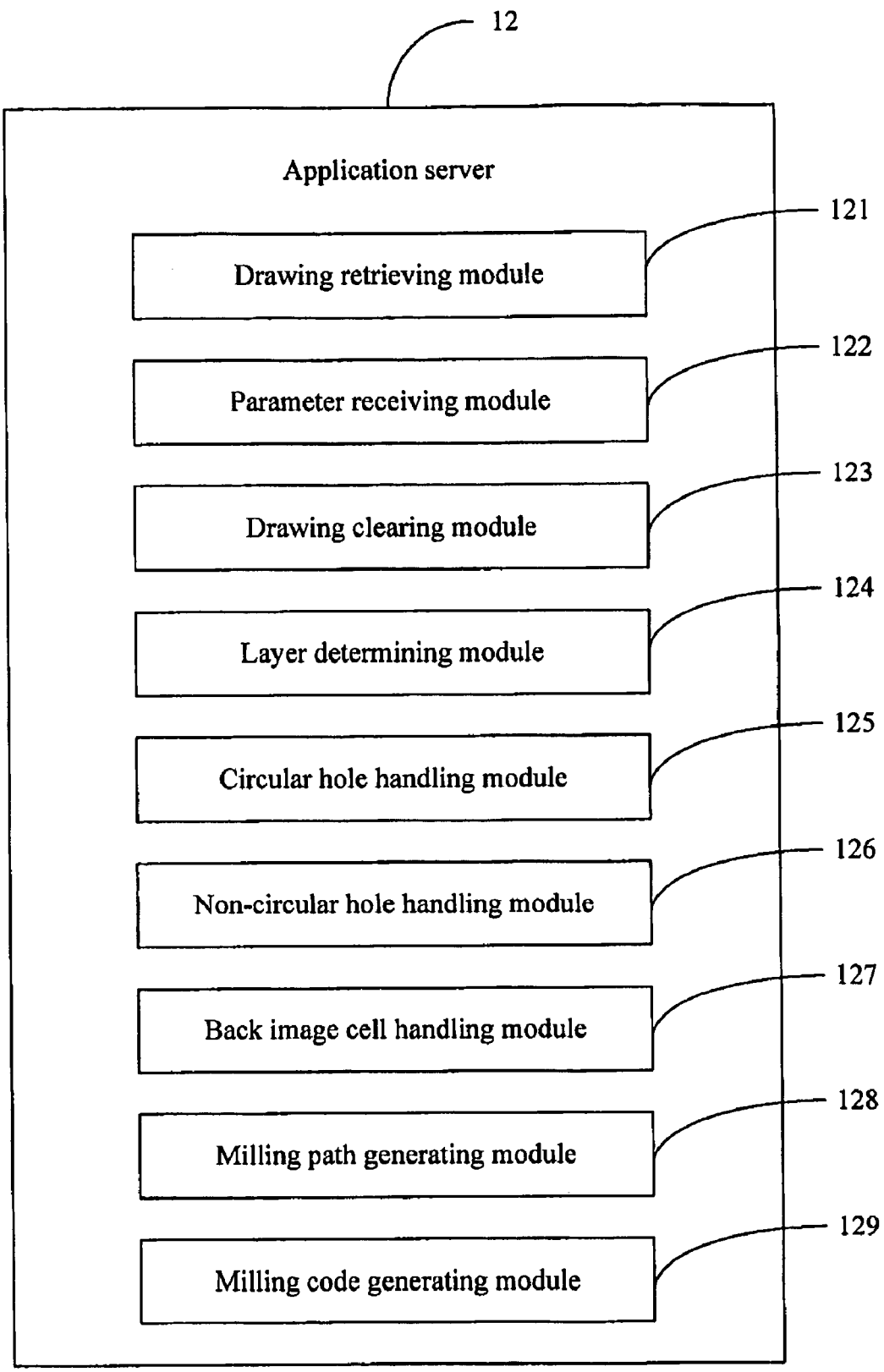
FIG. 2 is a schematic diagram of modules of an application server of the system of FIG. 1.

FIG. 2 is a schematic diagram of modules of the application server 12. The application server 12 comprises a drawing retrieving module 121, a parameter receiving module 122, a drawing clearing module 123, a layer determining module 124, a circular hole handling module 125, a non-circular hole handling module 126, a back image cell handling module 127, a milling path generating module 128, and a milling code generating module 129.

The drawing retrieving module 121 retrieves drawing information of workpieces to be milled from the database 14. The drawing information comprises image cell information and relevant parameters information. In the exemplary embodiment, image cells are divided into circular holes and non-circular holes. The parameters information comprises drawing numbers, workpiece materials, workpiece thicknesses, part quantities, labeled sizes, heat treatment requirements, and so on.

The parameter receiving module 122 receives milling parameters from the drawing retrieving module 121 and the personal computers 10. Therefore one portion of the milling parameters comprises the parameters information contained in the drawing information; and the other portion of the milling parameters, obtained from the user interfaces of the personal computers 10, comprises part quantities and programmer names.

The drawing clearing module 123 deletes unnecessary image cells. In the exemplary embodiment, deleting may comprise any one or more of: deleting all image cells of a drawing layer that includes image cells selected by a user; only deleting image cells selected by a user; and deleting image cells having the same name as a block of image cells selected by a user.

The layer determining module 124 determines a machining boundary as a contour layer. The contour layer can be used for determining a machining benchmark in subsequent machining procedures. The machining benchmark is a base point of coordinates of the machining image cells. Therefore, all the image cells have respective coordinates when the machining benchmark is determined.

The circular hole handling module 125 handles all circular holes in the engineering drawing. That is, all the circular holes are converted to image cells that can be identified by the system. At the same time, relevant machining parameters of the circular holes are received from the milling parameters in the parameter receiving module 122.

The non-circular hole handling module 126 determines and handles non-circular holes. The non-circular hole handling module 126 determines whether there is a non-circular hole. If there is a non-circular hole, the non-circular hole handling module 126 connects all lines of the non-circular hole to form polylines. At the same time, relevant machining parameters of the non-circular holes are respectively received from the milling parameters in the parameter receiving module 122 and the personal computers 10.

If the image cells are machined with high precision, there is a need to machine small holes in the image cells machined by a linear cutting procedure. The small holes are used in the linear cutting in a next procedure.

The back image cell handling module 127 determines and handles back image cells in each drawing. In an actual machining process, the workpiece has a top surface and a bottom surface. The back image cells are machined at the bottom surface.

The back image cell handling module 127 determines whether there is a back image cell in the drawing. If there is a back image cell in the drawing, the back image cell handling module 127 deletes all the back image cells from the drawing. At the same time, the back image cell handling module 127 creates a back drawing that is a mirror image of the drawing. The back drawing only includes the back image cells. In the exemplary embodiment, image cells other than back image cells are defined as front image cells. Therefore the drawing only has the front image cells, and the back drawing only has the back image cells.

The milling path generating module 128 generates milling paths according to the parameters of the circular holes and the non-circular holes. In addition, the shortest milling path is selected based on the machining benchmark. If there are back image cells in the drawing, the milling paths include milling paths of the front image cells and milling paths of the back image cells. If there are no back image cells in the drawing, the milling paths are only milling paths of the front image cells.

The milling code generating module 129 generates milling codes according to the milling paths. The milling codes correspond to the milling paths. That is, if there are back image cells in the drawing, the milling codes comprise two parts. Finally, the milling codes are output to a machining center for machining of the workpiece automatically.

Figure 3:
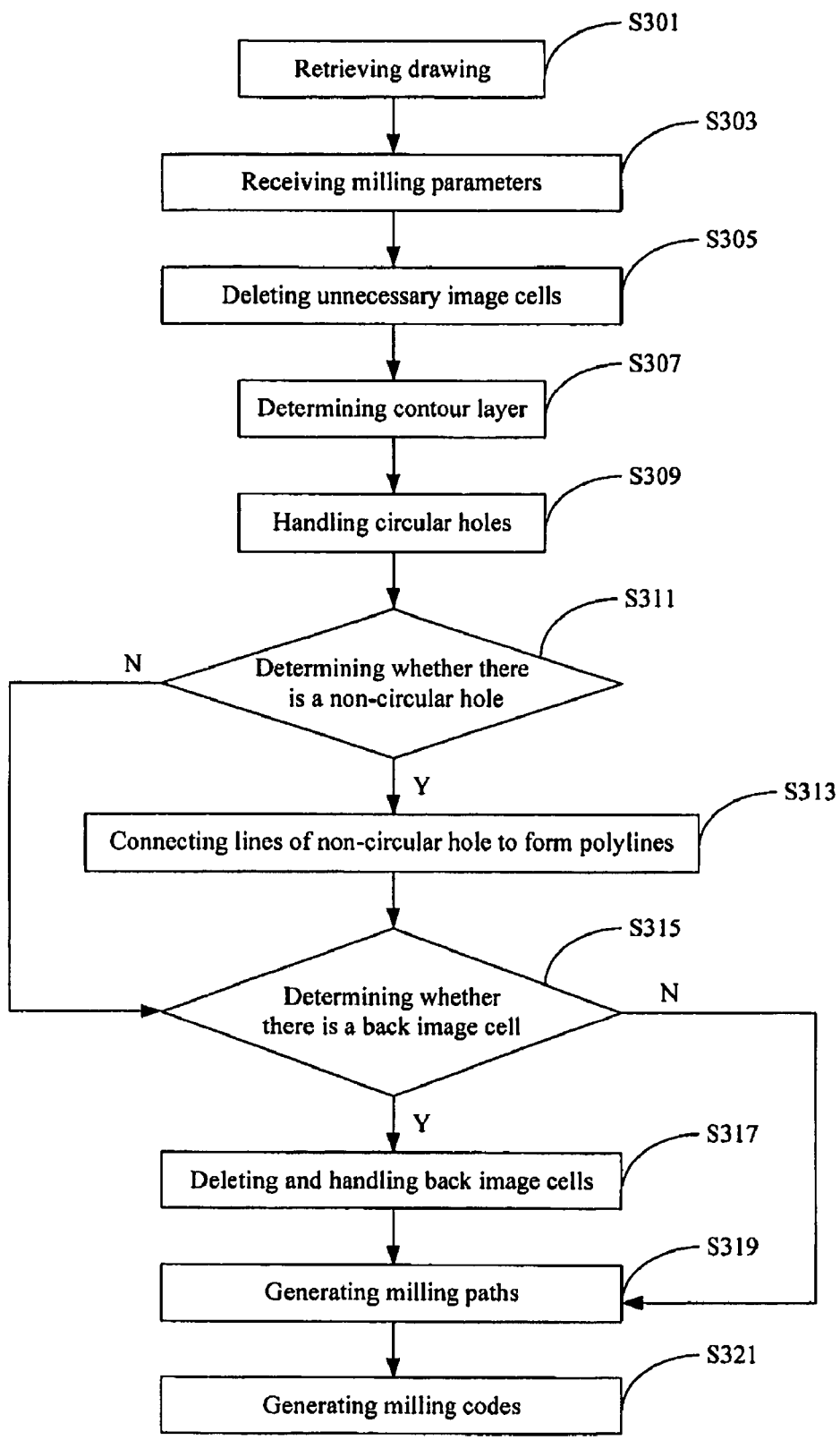
FIG. 3 is a flow chart of a method for generating milling codes of an exemplary embodiment of the invention.

FIG. 3 is a flow chart of a method for generating milling codes of an exemplary embodiment of the invention. In step S301, the drawing retrieving module 121 retrieves drawing information of workpieces to be milled from the database 14. The drawing information comprises image cell information and relevant parameters information. The parameters information comprises drawing numbers, workpiece materials, workpiece thicknesses, part quantities, labeled sizes, heat treatment requirements, and so on.

In step S303, the parameter receiving module 122 receives milling parameters from the drawing retrieving module 121 and the personal computers 10. Therefore one portion of the milling parameters comprises the parameters information contained in the drawing information; and the other portion of the milling parameters, obtained from the user interfaces of the personal computers 10, comprises part quantities and programmer names.

In step S305, the drawing clearing module 123 deletes unnecessary image cells. In the exemplary embodiment, deleting may comprise any one or more of: deleting all image cells of a drawing layer that includes image cells selected by a user; only deleting image cells selected by a user; and deleting image cells having the same name as a block of image cells selected by a user.

In step S307, the layer determining module 124 determines a machining boundary as a contour layer. The contour layer can be used for determining a machining benchmark in subsequent machine procedures. The machining benchmark is a base point of coordinates of the machining image cells. Therefore, all the image cells have respective coordinates when the machining benchmark is determined.

In step S309, the circular hole handling module 125 handles all circular holes in the engineering drawing. That is, all the circular holes are converted to image cells that can be identified by the system. At the same time, relevant machining parameters of the circular holes are received from the milling parameters in the parameter receiving module 122.

In step S311, the non-circular hole handling module 126 determines whether there is a non-circular hole in the drawing. If there is no non-circular hole, the procedure goes directly to step S315 described below. If there is a non-circular hole, in step S313, the non-circular hole handling module 126 connects all lines of the non-circular holes to form polylines. At the same time, relevant machining parameters of the non-circular holes are respectively received from the milling parameters in the parameter receiving module 122 and the personal computers 10. Thereupon, the procedure goes to step S315 described below.

In step S315, the back image cell handling module 127 determines whether there is a back image cell in the drawing. If there is no back image cell, the procedure goes directly to step S319 described below. If there is a back image cell, in step S317, the back image cell handling module 127 deletes all the back image cells from the drawing, and creates a back drawing that is a mirror image of the drawing. The back drawing only includes the back image cells. In the exemplary embodiment, image cells other than back image cells are defined as front image cells. Thereupon, the procedure goes to step S319 described below.

In step S319, the milling path generating module 128 generates milling paths according to the parameters of the circular holes and the non-circular holes. In addition, the shortest milling paths are selected based on the machining benchmark. If there is no back image cell, the milling paths are of the front image cells only. If there are back image cells, the milling paths include milling paths of the front image cells and milling paths of the back image cells.

In step S321, the milling code generating module 129 generates milling codes according to the milling paths. The milling codes correspond to the milling paths. That is, if there are back image cells, the milling codes comprise two parts. Finally, the milling codes are output to a machining center for processing of the workpiece automatically.

While particular embodiments has been described above, it should be understood that it has been presented by way of example only and not by way of limitation. Thus the breadth and scope of the present invention should not be limited by the above-described exemplary embodiments, but should be defined only in accordance with the following claims and their equivalents.

We claim:

1. A method for generating milling codes, comprising the steps of:
   (a) retrieving drawing information;
   (b) receiving milling parameters;
   (c) deleting unnecessary image cells in an engineering drawing;
   (d) determining a machining boundary as a contour layer;

(e) handling circular holes in the engineering drawing;
(f) determining whether there are non-circular holes in the engineering drawing;
(g) determining whether there is a back image cell in the engineering drawing;
(h) generating milling paths according to parameters of the circular holes and a result of the determination of non-circular holes, and selecting a shortest milling path; and
(i) generating milling codes according to the shortest milling path.

2. The method as recited in claim 1, wherein step (f) further comprises the step of connecting all lines of non-circular holes to form polylines.

3. The method as recited in claim 1, wherein step (g) further comprises the step of deleting a determined back image cell in the engineering drawing and creating a back drawing having the back image cell.

4. The method as recited in claim 1, wherein the drawing information retrieved comprises image cell information and parameters information, and the parameters information comprises any one or more of drawing numbers, workpiece materials, workpiece thicknesses, part quantities, labeled sizes, and heat treatment requirements.

5. The method as recited in claim 1, wherein the milling parameters received comprise parameters contained in the retrieved drawing information and parameters obtained from one or more personal computers.

6. The method as recited in claim 5, wherein the parameters obtained from the one or more personal computers comprise any one or more of part quantities and programmer names.

7. A system for generating milling codes, comprising:
a plurality of personal computers;
a database; and
an application server connected between the personal computers and the database, the application server comprising:
a circular hole handling module, for determining and handling circular holes of an engineering drawing, and receiving relevant parameters of the circular holes;
a non-circular hole handling module, for determining and handling non-circular holes of the engineering drawing, and receiving relevant parameters of the non-circular holes;
a milling path generating module, for generating milling paths according to the parameters of the circular holes and the non-circular holes, and selecting a shortest milling path; and
a milling code generating module, for generating milling codes according to the shortest milling path.

8. The system as recited in claim 7, wherein the application server further comprises a drawing retrieving module, for retrieving information of workpieces to be milled from the database.

9. The system as recited in claim 8, wherein the information retrieved by the drawing retrieving module comprises image cell information and parameters information, and the parameters information comprises any one or more of drawing numbers, workpiece materials, workpiece thicknesses, part quantities, labeled sizes, and heat treatment requirements.

10. The system as recited in claim 8, wherein the application server further comprises a parameter receiving module, for receiving milling parameters from the drawing retrieving module and the personal computers.

11. The system as recited in claim 10, wherein the milling parameters received by the parameter receiving module comprise parameters information contained in the drawing retrieving module and information obtained from one or more of the personal computers.

12. The system as recited in claim 11, wherein the information obtained from the personal computers comprises any one or more of part quantities and programmer names.

13. The system as recited in claim 7, wherein the application server further comprises a drawing clearing module, for deleting unnecessary image cells of the engineering drawing.

14. The system as recited in claim 7, wherein the application server further comprises a layer determining module, for determining a machining boundary as a contour layer.

15. The system as recited in claim 14, wherein the contour layer determines a machining benchmark.

16. The system as recited in claim 7, wherein the application server further comprises a back image cell handling module, for identifying any back image cells of the engineering drawing.

* * * * *